S. J. OLMSTED.
Churn-Dashers.
No. 151,152. Patented May 19, 1874.
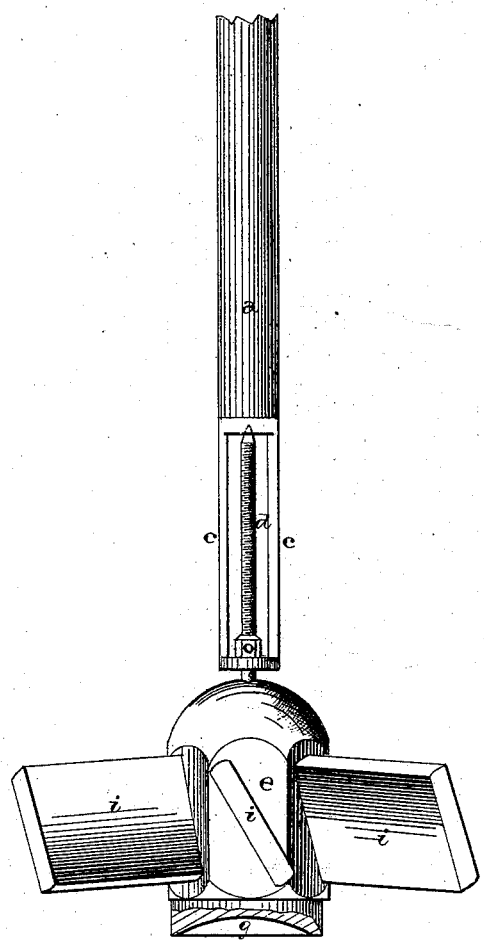

UNITED STATES PATENT OFFICE.

SAMUEL J. OLMSTED, OF BINGHAMTON, NEW YORK, ASSIGNOR TO MORAND STAMPFLER, OF SAME PLACE.

IMPROVEMENT IN CHURN-DASHERS.

Specification forming part of Letters Patent No. 151,152, dated May 19, 1874; application filed March 21, 1874.

*To all whom it may concern:*

Be it known that I, SAML. J. OLMSTED, of Binghamton, in the county of Broome and State of New York, have invented certain new and useful Improvements in Churn-Dashers; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in churn-dashers; and it consists in the arrangement and combination of parts which will be more fully described hereafter.

The accompanying drawings represent my invention.

A represents an ordinary churn-handle, to the lower end of which is secured the slotted frame c, made of any non-corrosive metal, and which has a hole made through its lower end, and a bearing for the end of the spindle d in its upper one. The dash e is made of a block of wood, or other suitable material, having its bottom made concave, so as to form an air-chamber, g, and having a number of inclined wings, i, projecting from its sides, which cause the dash to rapidly revolve in reverse directions as it is moved back and forth through the milk. Secured in the top of the dash, and projecting up into the frame c, is the screw-spindle d, which is centered in position by having its upper end sharpened, so as to catch in the bearing in the frame, and which is prevented from coming out by the nut o. The spindle is threaded its entire length, and is made long enough to leave a slight space between the top of the dash and lower end of the frame, so that as the spindle wears away the nut can be screwed down so as to compensate for the loss. Each time that the dash is raised above the milk, a volume of air is taken into the chamber g, which, as the dash is forced downward through the milk or cream, is drawn out by the rotation of the wings, and mingled with the cream, thereby greatly assisting in breaking up the globules which hold the butter.

Having thus described my invention, I claim—

The combination of the handle a, slotted frame c, adjustable spindle d, having a double-bearing nut, o, and revolving dasher having an air-chamber formed in its under side, substantially as shown and described.

In testimony that I claim the foregoing I have hereunto set my hand this 9th day of March, 1874.

SAMUEL J. OLMSTED.

Witnesses:
T. M. CLARK,
EDWARD K. CLARK.